United States Patent
Goyal

(10) Patent No.: US 11,250,019 B1
(45) Date of Patent: Feb. 15, 2022

(54) EVENTUALLY CONSISTENT REPLICATION IN A TIME-SERIES DATABASE

(71) Applicant: Amazon Technologies, Inc., Seattle, WA (US)

(72) Inventor: Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 16/287,822

(22) Filed: Feb. 27, 2019

(51) Int. Cl.
*G06F 16/30* (2019.01)
*G06F 16/27* (2019.01)
*G06F 16/2458* (2019.01)
*G06F 16/23* (2019.01)

(52) U.S. Cl.
CPC .......... *G06F 16/27* (2019.01); *G06F 16/2379* (2019.01); *G06F 16/2477* (2019.01)

(58) Field of Classification Search
CPC ... G06F 16/27; G06F 16/2379; G06F 16/2477
See application file for complete search history.

(56) References Cited

U.S. PATENT DOCUMENTS

| | | | |
|---|---|---|---|
| 8,132,046 B2 | 3/2012 | Varghese | |
| 8,276,154 B2 | 9/2012 | Toub et al. | |
| 8,335,765 B2 | 12/2012 | Sivasubramanian et al. | |
| 8,386,540 B1 | 2/2013 | McAlister et al. | |
| 8,595,547 B1 | 11/2013 | Sivasubramanian et al. | |
| 8,601,112 B1 | 12/2013 | Nordstrom et al. | |
| 9,128,965 B1* | 9/2015 | Yanacek | G06F 16/2282 |
| 9,286,001 B2 | 3/2016 | Skjolsvold et al. | |
| 9,449,122 B2 | 9/2016 | Haas et al. | |
| 9,607,019 B1 | 3/2017 | Swift et al. | |
| 9,607,067 B2 | 3/2017 | Haas et al. | |
| 9,626,374 B2 | 4/2017 | Hirsch et al. | |
| 9,672,257 B2 | 6/2017 | Tobin et al. | |
| 9,817,727 B2 | 11/2017 | McAlister et al. | |
| 9,836,492 B1 | 12/2017 | Hermanson | |
| 9,934,107 B1 | 4/2018 | Chikkanayakanahally et al. | |
| 10,007,513 B2 | 6/2018 | Malladi et al. | |

(Continued)

OTHER PUBLICATIONS

Article entitled "Can Cassandra be a Time-Series Database Alternative", by Canary, dated Jun. 1, 2018 (Year: 2018).*

(Continued)

*Primary Examiner* — Mahesh H Dwivedi
(74) *Attorney, Agent, or Firm* — Robert C. Kowert; Kowert, Hood, Munyon, Rankin & Goetzel, P.C.

(57) ABSTRACT

Methods, systems, and computer-readable media for eventually consistent replication in a time-series database are disclosed. Time-series data is stored in a plurality of replicas of a replica group. The time-series data is within spatial and temporal boundaries of the replica group. The replicas store a server-side version number of replica group metadata. A query processor sends a query request to a first replica of the replica group. The query request comprises a query-client-side version number of the replica group metadata. The first replica performs a comparison of the query-client-side version number to the server-side version number. The first replica generates a successful response to the query request or denies the query request based at least in part on the comparison, where the successful response comprises one or more elements of the time-series data.

20 Claims, 13 Drawing Sheets

(56) References Cited

U.S. PATENT DOCUMENTS

| | | | |
|---|---|---|---|
| 10,997,137 B1* | 5/2021 | Goyal | G06F 16/248 |
| 11,068,537 B1* | 7/2021 | Goyal | G06F 16/278 |
| 2013/0042083 A1* | 2/2013 | Mutalik | G06F 16/185 |
| | | | 711/162 |
| 2015/0363124 A1* | 12/2015 | Rath | G06F 11/2041 |
| | | | 709/219 |
| 2017/0075965 A1* | 3/2017 | Liu | G06F 16/27 |
| 2020/0099614 A1* | 3/2020 | Vutharkar | G06F 16/245 |

OTHER PUBLICATIONS

U.S. Appl. No. 16/116,791, filed Aug. 29, 2018, Mustafa Ozan Ozen.
U.S. Appl. No. 16/176,629, filed Oct. 31, 2018, Dumanshu Goyal.
U.S. Appl. No. 16/216,580, filed Dec. 11, 2018, Dumanshu Goyal.
U.S. Appl. No. 16/199,078, filed Nov. 23, 2018, Timothy A. Rath.
U.S. Appl. No. 16/199,102, filed Nov. 23, 2018, Lonnie J. Princehouse.
U.S. Appl. No. 16/199,103, filed Nov. 23, 2018, Timothy A. Rath.
U.S. Appl. No. 16/219,686, filed Dec. 13, 2018, Dumanshu Goyal.
U.S. Appl. No. 16/267,330, filed Feb. 4, 2019, Dumanshu Goyal.

* cited by examiner

US 11,250,019 B1

EVENTUALLY CONSISTENT REPLICATION IN A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
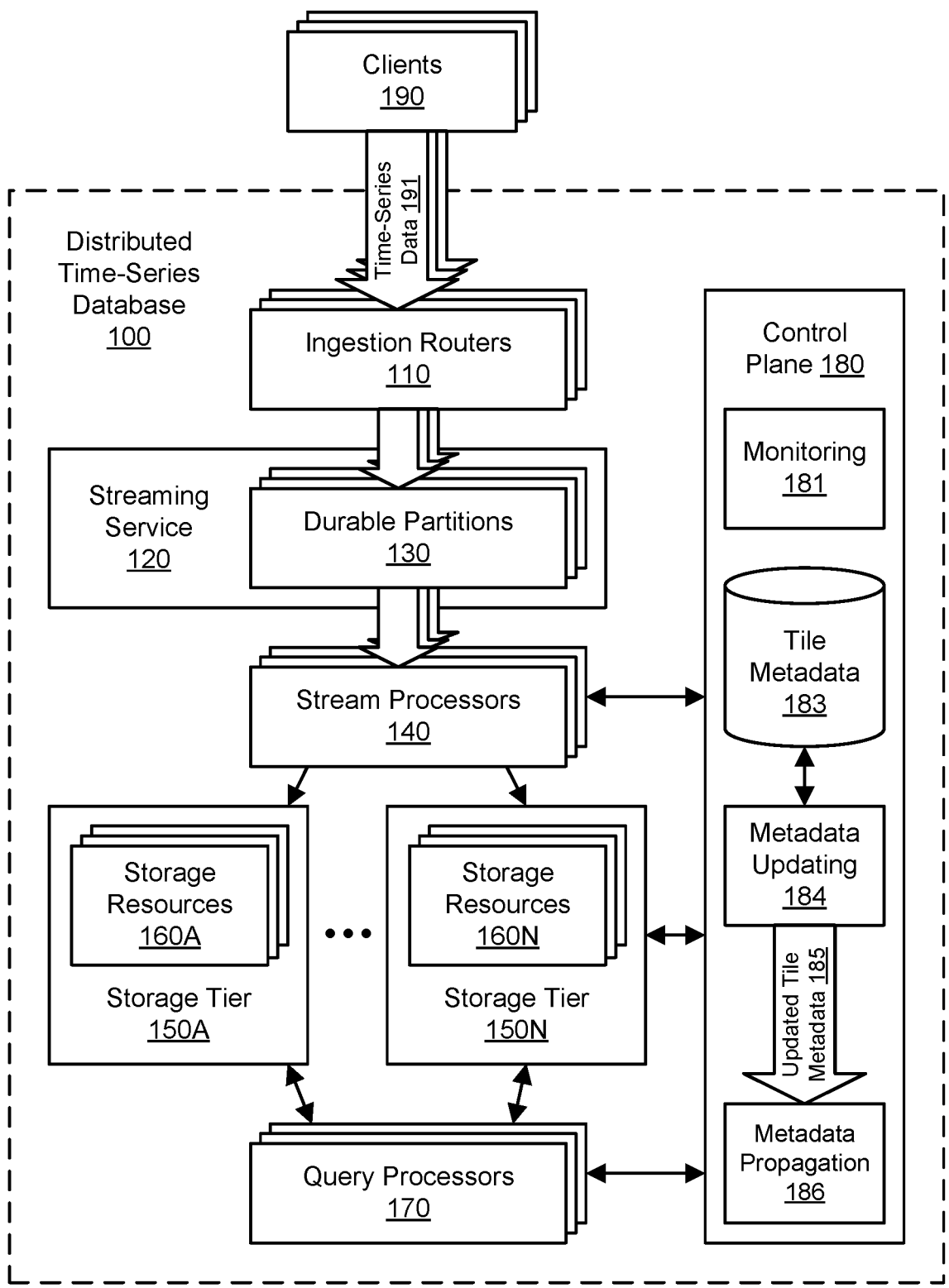
FIG. 1 illustrates an example system environment for eventually consistent replication in a time-series database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for eventually consistent replication in a time-series database are described. A time-series database may include a set of stream processors, also referred to as writers, that process one or more streams of time-series data in a distributed manner. The time-series data may be partitioned into a set of tiles along non-overlapping temporal and spatial boundaries. A particular tile having particular temporal and spatial boundaries may be represented by a plurality of replicas. The replicas may be stored using a set of storage nodes that are distributed across various data centers, availability zones, or other logical or geographical locations. The storage nodes may offer low-latency and high-availability write and read access to a "hot tier" of data, such as the most recent data elements from the stream(s). However, transient or long-lasting outages at the storage nodes may reduce the availability of the database for both writes and reads. Stream processors, query processors, and replicas may each store snapshots of replica group metadata, where the snapshots have version numbers. Different version numbers may reflect membership changes in the replica group, status changes for individual replicas, boundary changes for the replica group, and other state transitions. When version numbers of the metadata differ between a stream processor and a replica or between a query processor and a replica, and components are required to have the same version, then writes and reads can fail and need to be retried after the latest metadata is propagated to the out-of-date component.

Using the techniques described herein, one or more replication protocols may be used to commit writes to a replica group and/or serve query requests efficiently while achieving eventual consistency among the replicas in a replica group. For example, a write request may be performed by a particular replica only if the version number of the metadata included in the request is equal to the version number of the metadata at the replica. However, a replica with a newer version number may perform and acknowledge the write after another replica with an older version number has performed and acknowledged the write. Using a commit protocol, a write may be deemed committed by a stream processor only if the write is successfully acknowledged by each replica in the replica group and also if the version number at the acknowledging replicas was less than or equal to the version number at the stream processor. Using these techniques, the database may perform client-side replication with bounded eventual consistency while continuing to ingest new data even if the data is out of order or even if one or more replicas experience an outage. More reliable and efficient ingestion may permit data to be made available sooner for queries. As another example of a protocol, a query may be performed by a particular replica only if the version number of the metadata included in the request is less than or equal to the version number of the metadata at the replica. The replica may implement an additional constraint such that the query is performed if the query boundaries represent a subset of the replica boundaries. In another mode, the replica may implement an additional constraint such that the query is performed if the query-client-side version number is less than or equal to the server-side version number and the newer metadata represents a membership update and not a boundary update. In one embodiment, the query request may be denied if the replica is marked as read-ineligible in the metadata, e.g., if the replica has been slow to ingest new data. Using these protocols, the time-series database may be highly available for writes and/or reads.

As one skilled in the art will appreciate in light of this disclosure, embodiments may be capable of achieving certain technical advantages, including some or all of the following: (1) improving the availability and reducing the latency of writes in a distributed database by permitting new data to be written efficiently to a replica group and committed even if one or more replicas undergo a transient outage; (2) improving the availability and reducing the latency of writes in a distributed database by permitting new data to be written efficiently to a replica group and committed even if one or more replicas are dropped and replaced; (3) improving the availability and reducing the latency of reads in a distributed database by permitting queries to be performed for replicas that may offer stale data; (4) improving the availability and latency of a distributed database by permitting out-of-order writes with bounded eventual consistency among a replica group; (5) improving the performance of a distributed database by committing writes to a replica group using a client-side commit protocol without the need for implementing and executing a server-side consensus engine; (6) improving network utilization by reducing retries of write requests and query requests; and so on.

FIG. 1 illustrates an example system environment for eventually consistent replication in a time-series database, according to some embodiments. A distributed time-series database 100 may ingest and store time-series data 191 and make the stored data available for queries. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. In one embodiment, a control plane 180 may include a monitoring component 181 that obtains data relating to the usage and/or performance of the database 100 in order to inform the scaling.

The ingested time-series data 191 may represent a large number of individual time series. An individual time series may include a sequence of values or observations (e.g., for a feature of a system or a phenomenon) that can be plotted over time. An individual time series may be uniquely identified by a set of dimensions such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on. In one embodiment, any change to such a dimension may produce a new time series in the database 100.

The database 100 may manage a large amount of time-series data throughout the lifecycle of the data. The times-series data 191 may be received at the database 100 using a fleet of ingestion routers 110. The time-series data may typically arrive at the database 100 in time order, but the database may be able to ingest out-of-order data as well. The ingestion routers 110 may divide the data 191 from the clients 190 into non-overlapping partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

The partitions 130 may be maintained using persistent storage resources and may be termed durable partitions. In various embodiments, the durable partitions 130 may be provided by a streaming service 120 or by a durable data store. The streaming service 120 may use shards or other divisions to implement the non-overlapping partitions 130. The streaming service 120 or control plane 180 may dynamically increase or decrease the number of partitions based (at least in part) on the amount or rate of ingestion of time-series data. Similarly, the control plane 180 may dynamically increase or decrease the number of ingestion routers 110 based (at least in part) on the amount or rate of ingestion of time-series data. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

A fleet of stream processors 140 may take the time-series data from the durable partitions 140, potentially process the data in various ways, and add the data to one or more storage tiers 150A-150N. For example, one stream processor may write data from one partition to a "hot" storage tier, and another stream processor may write data from the same partition to a "cold" storage tier. As another example, a stream processor may create materialized views or derived tables based on a partition, such as an aggregation or rollup of a time interval. In various embodiments, stream processors may perform reordering, deduplication, aggregation of different time periods, and other transformations on time series data. The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, as the number of partitions increases or decreases based on the amount or rate of ingestion, the number of stream processors may also tend to increase or decrease dynamically. The stream processors 140 may determine that elements of time-series data are committed across a replica group based (at least in part) on one or more protocols that will be described in greater detail below.

In one embodiment, the stream processors 140 may organize the time series in tables. The stream processors 140 may also be referred to as writers or table builders. A table may store one or more time series. A table may be a named entity that stores related time series that are usable by the same application. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits users (e.g., developers of applications) and other systems to perform management and modeling of time series data. For example, the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, clients may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100. The stream processors 170 and/or storage resources 160A-160N may perform or deny queries based on one or more protocols that will be described in greater detail below.

In one embodiment, one or more components of the distributed database 100, such as compute instances and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, portions of the functionality of the provider network, such as the distributed database 100, may be offered to clients in exchange for fees.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism.

A particular tile may be associated with tile metadata maintained in a tile metadata repository 183, e.g., by the control plane 180. The membership of a replica group (e.g., addresses or other identifying characteristics of the particular replicas in the tile's replica group), the status of individual replicas, and the spatial and temporal boundaries of the replica group may be expressed in a metadata snapshot in the tile metadata repository 183. The control plane 180 may include a component for metadata updating 184. The replica group metadata for a set of replicas (or the corresponding tile) may be updated to reflect a state transition, and the version number of the metadata may be increased. For example, the metadata updating 184 may be performed to reflect a change in the membership of a replica group, a change in the status of one or more individual replicas, or a change in the spatial and temporal boundaries of the replica group. A snapshot of the replica group metadata may be associated with a version number. The version numbers of the metadata may be incremented or otherwise increased to reflect the transition of the replica group from one state to another state. The version numbers may be used at various components of the database 100 to ensure that writes by stream processors and queries by query processors are being performed using up-to-date tile metadata.

The control plane 180 may maintain the current version of tile metadata for one or more tiles, e.g., using a durable store 183 for the metadata. The durable store 183 may support atomic updates to the metadata for a tile. In one embodiment, the metadata updating component 184 may create and/or generate updated tile metadata 185. In one embodiment, the control plane 180 may include a component 186 for propagation of tile metadata (such as updated tile metadata 185) to various components of the database 100, including stream processors 140, storage resources 160A-160N, and query processors 170. As shown in FIG. 1, the metadata propagation 186 may provide a particular version of tile metadata for a tile to the storage nodes that store the tile's replicas as well as to any stream processors and/or query processors that handle the replica group. New elements of time-series data may be routed by the stream processors to replicas according to the tile metadata.

In one embodiment, the tile metadata may include a range key (e.g., a hash value) for the tile, a start time for the tile, an end time for the tile, spatial bounds for the tile, and/or other identifying characteristics. In one embodiment, the tile metadata may include a status (e.g., "active") of the replica group. In one embodiment, the tile metadata may include a list of replicas, where each replica has a replica identifier, a list of one or more containers, and a status (e.g., "active"). A container may be associated in the tile metadata with a container identifier and a storage node identifier. The tile metadata may also include a version number or other version identifier. In one embodiment, the version number may increase monotonically as changes to the membership, replica status, or boundaries of the tile are implemented.

Figure 7:
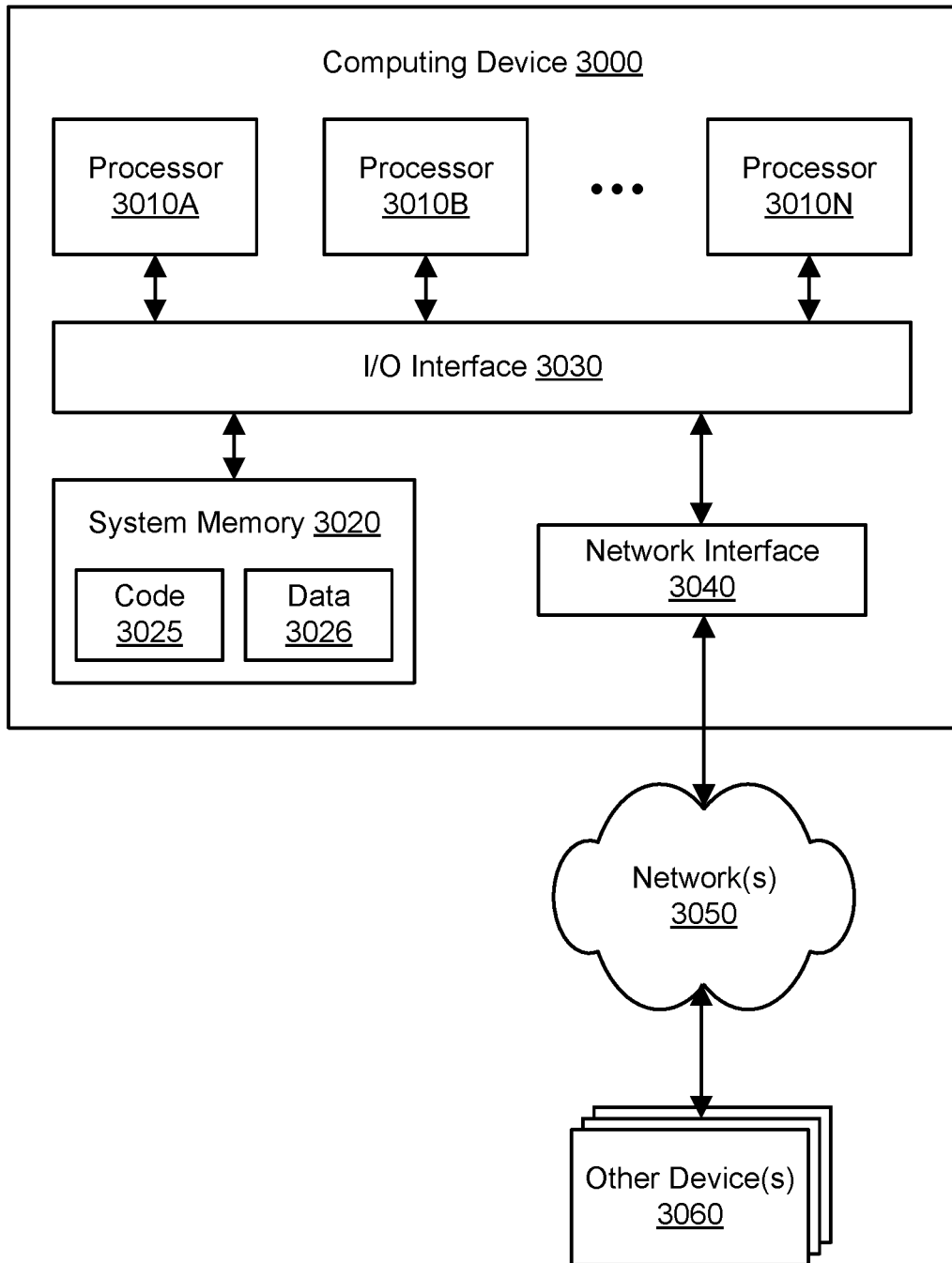
FIG. 7 illustrates an example computing device that may be used in some embodiments.

In various embodiments, components of the distributed database 100, such as the ingestion routers 110, streaming service 120, stream processors 140, storage resources 160A-160N, query processors 170, and/or control plane 180 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 7. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
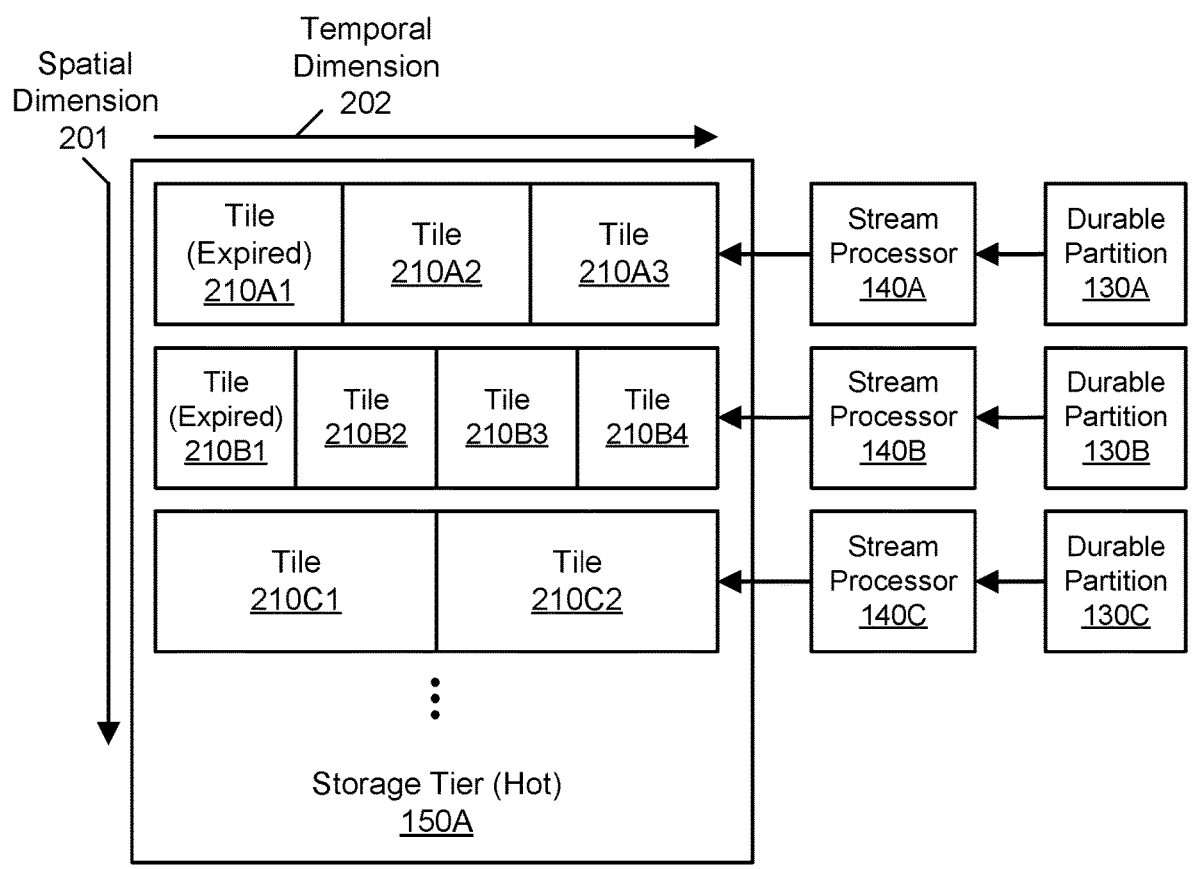
FIG. 2 illustrates further aspects of the example system environment for eventually consistent replication in a time-series database, including an example of two-dimensional tiles in a storage tier, according to some embodiments.

FIG. 2 illustrates further aspects of the example system environment for eventually consistent replication in a time-series database, including an example of two-dimensional tiles in a storage tier, according to some embodiments. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on hierarchical clustering that seeks to co-locate related measurements and/or time series in the same partition, and the hierarchical clustering may be performed by the ingestion routers 110. Tiles may also be partitioned along non-overlapping temporal boundaries. Due to the spatial dimension 201 and the temporal dimension 202, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ.

In the example of FIG. 2, a set of time series may be mapped to durable partitions 130A, 130B, and 130C based on a spatial range (e.g., hierarchical clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion.

As shown in the example of FIG. 2, stream processor 140A may write to an open tile 210A3 that was preceded in time by a tile 210A2 that was preceded in time by a now-expired tile 210A. Similarly, stream processor 140B may write to an open tile 210B4 that was preceded in time by a tile 210B3 that was preceded in time by a tile 210B2 that was preceded in time by a now-expired tile 210B1. Additionally, stream processor 140C may write to an open tile 210C2 that was preceded in time by a tile 210C1. As discussed above, the contents of a tile may be replicated (e.g., using three replicas) across different location or zones to achieve greater durability of the hot tier.

Figure 3A:
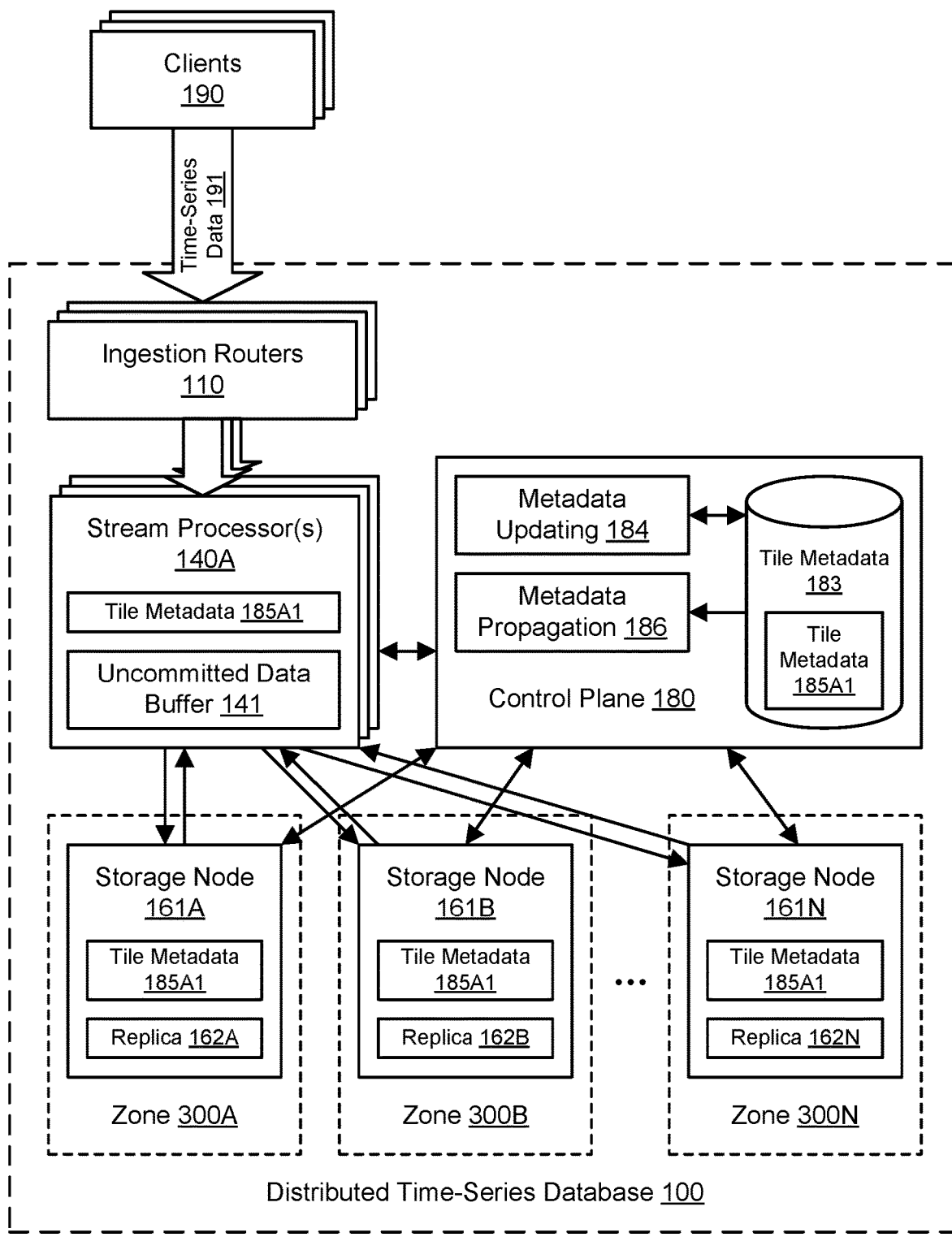
FIG. 3A through FIG. 3E illustrate further aspects of the example system environment for eventually consistent replication in a time-series database, including the use of a protocol for committing writes to a replica group, according to some embodiments.

FIG. 3A through FIG. 3E illustrate further aspects of the example system environment for eventually consistent replication in a time-series database, including the use of a protocol for committing writes to a replica group, according to some embodiments. In the "hot" storage tier 150A, a particular tile (such as tile 210A3) may be replicated across a set of replicas in a replica group. In one embodiment, a tile may have three replicas. The number of replicas may be determined based at least in part on user input and/or usage metrics, e.g., such that the number of replicas may be increased to lower a query latency for a particular tile or time series. As discussed above, tiles in the hot tier 150A may be stored by storage nodes using volatile memory resources for low-latency storage and retrieval of time-series data. To enhance the durability of the hot tier 150A, a replica group may be distributed across a plurality of availability zones, data centers, or geographical locations. As shown in the example of FIG. 3A, a replica group including replicas 162A, 162B, and 162N may be stored across one storage node 161A in a first zone 300Z, another storage node 161B in another zone 300B, and yet another storage node 161N in yet another zone 300N. In one embodiment, a given storage node may store replicas for different tiles.

Time-series data 191 may be partitioned spatially by the ingestion routers 110 and then processed by stream processors 140. In one embodiment, particular stream processors may be assigned to particular partitions of time-series data. For a particular tile, the stream processors may route data points of time-series data to individual replicas of the tile using tile metadata 185A1. The tile metadata 185A1 may indicate the three replicas 162A, 162B, and 162N; the status of the replicas (e.g., "ACTIVE" for both writes and reads); the spatial and temporal boundaries of the tile; and a version number of the metadata (e.g., version 6). The spatial boundaries may represent a spatial range of a plurality of keys. Keys may represent a combination of dimensions, tags, and/or other metadata of various time series. The temporal boundaries may represent a time range with a starting time and an ending time. The tile metadata 185A1 may be maintained by the control plane 180 in the tile metadata store 183 and provided by the control plane to other components of the database 100. The stream processor(s) 140 and storage nodes 161A-161N may have local copies of the tile metadata 185A1. In some embodiments, storage nodes 161A-161N may store a relevant subset of the tile metadata 185A1 or may store the entire tile metadata 185A1 but lack the ability to interpret the portions of it that relate to other replicas. Write requests may indicate the version number of the tile metadata at the stream processor, and a write attempt for time-series data may be successful only if both the stream processor and the storage node targeted for the write have the same version of the tile metadata. In some embodiments, if a write request is rejected by a replica for failing to meet an equality requirement for metadata version numbers, the replica may provide the updated metadata to the stream processor or notify the stream processor to obtain the updated metadata from the metadata repository 183; the stream processor may then retry the write request with the higher version number of the metadata. In one embodiment, tile metadata may first be propagated by the control plane 180 to the storage nodes, and the storage nodes may provide the latest tile metadata to stream processors that send write requests with outdated version numbers.

In one embodiment, the tile metadata 185A1 for a tile T1 may be represented with the following example data structure, with the tile restricted to a time range between 1 and 10 and a spatial range between 0x0000 and 0xFFFF, and with the tile having three replicas R1, R2, and R3 that are writable and readable:

```
{
tileId: "T1",
startTime: 1,
endTime: 10,
partitionStartKey: "0x0000",
partitionEndKey: "0xFFFF",
version: 2,
status: "ACTIVE",
replicas: [
  {
    containerId: "R1",
    status: "ACTIVE",
  },
  {
    containerId: "R2",
    status: "ACTIVE",
  },
  {
    containerId: "R3",
    status: "ACTIVE",
  },
],
}
```

Each of the stream processor(s) 140A may include a data buffer 141 for uncommitted updates to the replica group. An update may represent one or more data points or other elements of time-series data that the stream processor(s) 140A seek to add to the storage nodes 161A-161N. A replica may attempt to perform a write request if the version number of the metadata in the request is equal to the version number of the metadata at the replica. As shown in the example of FIG. 3A, the version numbers of the tile metadata 185A1 are the same across the stream processor(s) 150A and the storage nodes 161A-161N, and so the write requests may be acknowledged by all of the replicas. According to a commit protocol, an update may be deemed committed by the stream processor(s) 140A if all of the replicas in the replica group acknowledge a successful write of the update and if the version number of the metadata at the replicas is less than or equal to the version number of the metadata at the stream processor(s). As shown in the example of FIG. 3A, the version numbers of the tile metadata 185A1 are the same across the stream processor(s) 150A and the storage nodes 161A-161N, and so the updates may be deemed committed and may not be retained in the uncommitted data buffer 141.

Figure 3B:
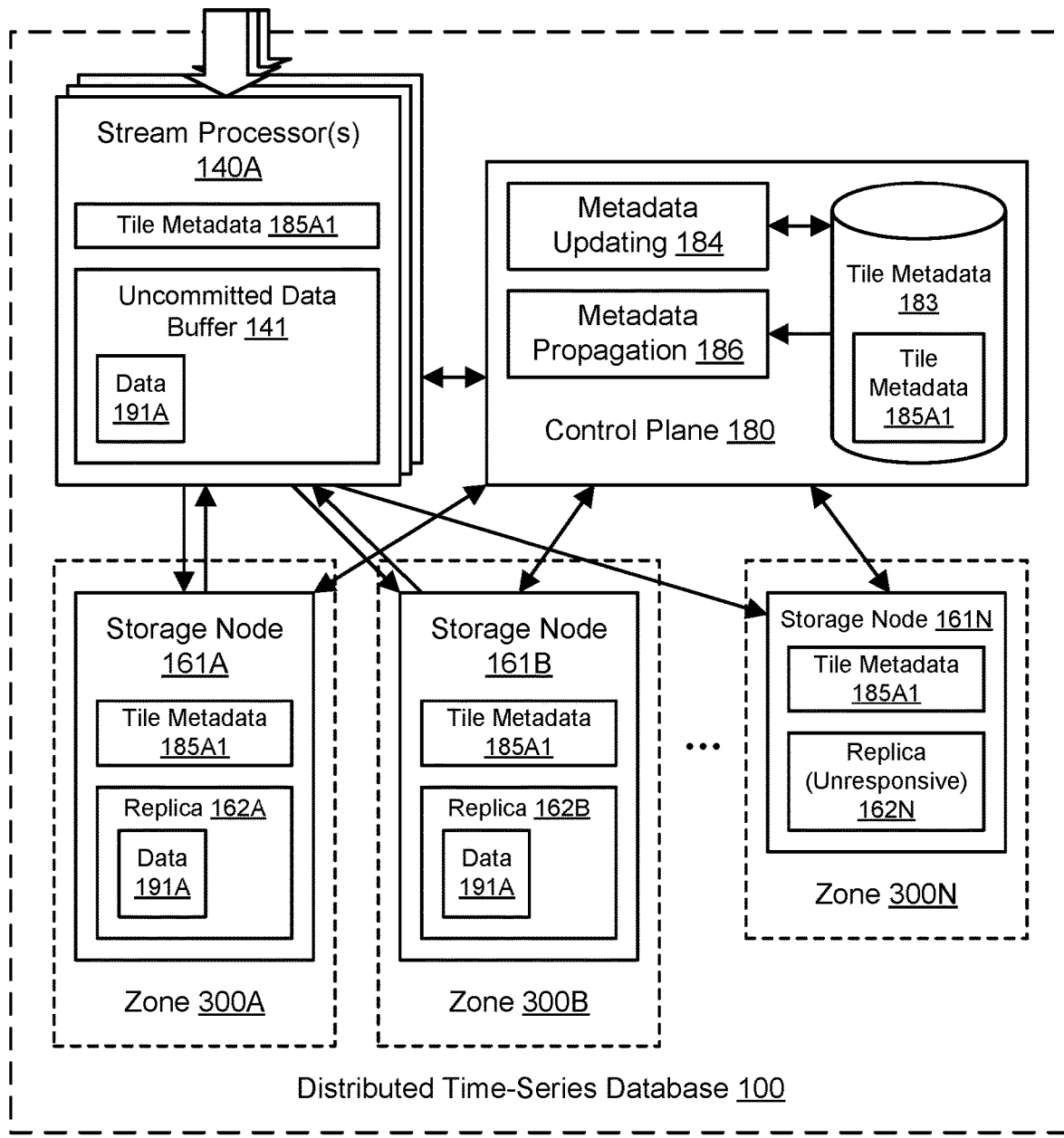

FIG. 3B represents a continuation of the example of FIG. 3A at a later point in time. As shown in FIG. 3B, an update of data point 191A may be written to both replica 162A and replica 162B. However, the write request for the data 191A to replica 162N may be unacknowledged. The replica 162N may be unresponsive for a period of time, e.g., due to a network outage, a zone-wide outage, or performance problems at the storage node 161N. As long as the write of the data 191A is not acknowledged by each and every replica in the replica group, the data 191A may remain in the uncommitted data buffer 141.

Figure 3C:
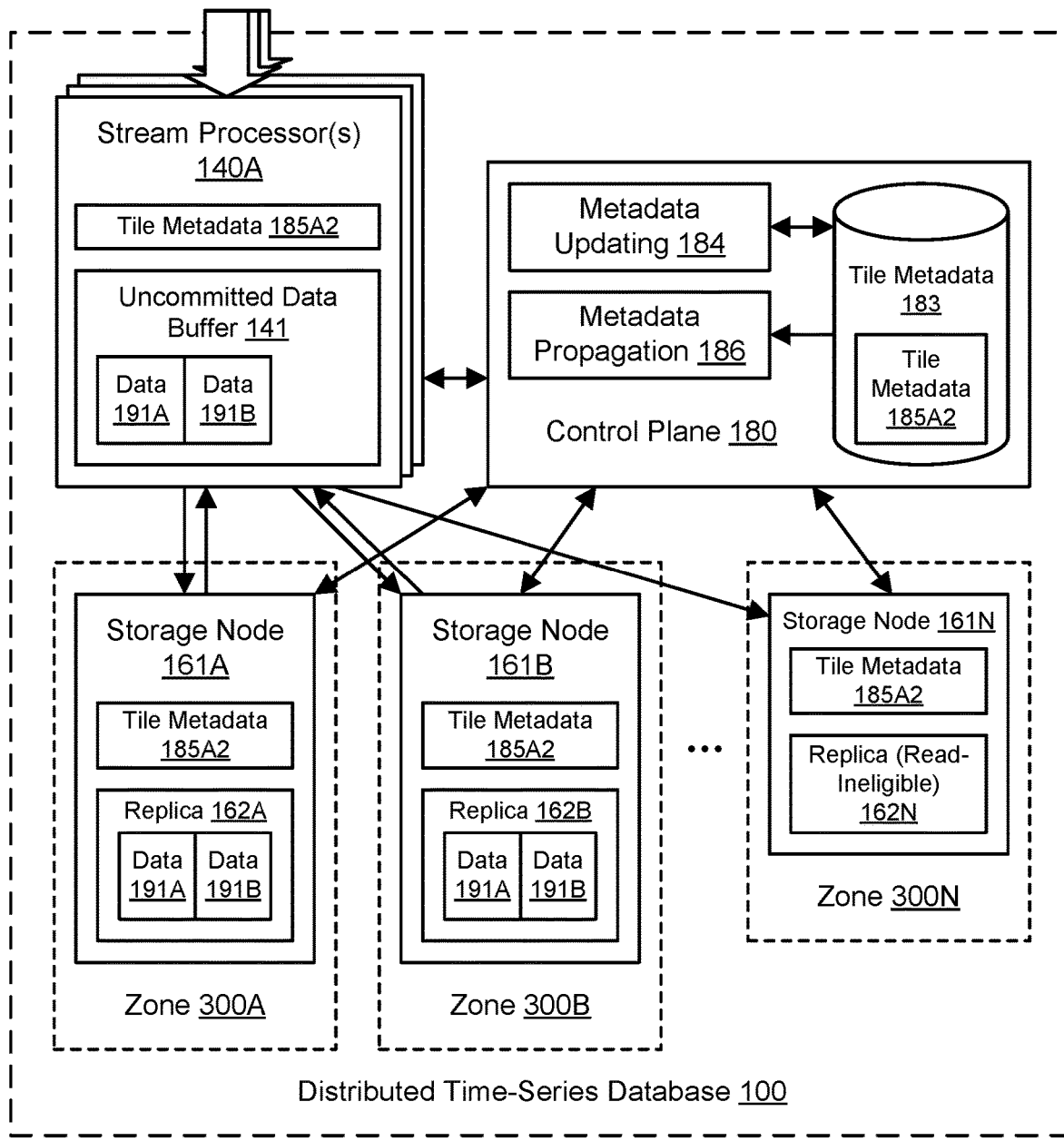

FIG. 3C represents a continuation of the example of FIG. 3B at a later point in time. The uncommitted data buffer 141 may be associated with a low watermark (availability threshold) and a high watermark (availability threshold). The lower watermark may represent a lower percentage of the maximum size of the data buffer 141 or another metric related to the size and/or duration represented by buffered but uncommitted updates. The higher watermark may represent a higher percentage of the maximum size of the data buffer 141 or another metric related to the size and/or duration represented by buffered but uncommitted updates. Additionally, the buffer 141 may have a maximum buffer size that is higher than the high watermark. In one embodiment, no action may be taken when the low watermark is exceeded. However, if the high watermark is exceeded, then the one or more unresponsive replicas (e.g., replica 162N) may be marked as read-ineligible in the tile metadata due to the assumed staleness of their contents. As shown in the example of FIG. 3C, the high watermark may be exceeded when data updates 191A and 191B are successfully written to replicas 162A and 162B (e.g., with metadata version 185A1) but not to replica 162N. The control plane may generate updated metadata 185A2 that reflects a change in status of the replica 162N to read-ineligible. The updated metadata 185A2 may be propagated to the stream processor(s) 140A, storage nodes 161A-161N, and/or query processors 170. In one embodiment, the storage node 161N may be unreachable and may retain the outdated metadata 185A1. Meanwhile, the data updates 191A and 191B may be maintained in the buffer 141 after having been acknowledged by the replicas 162A and 162B with the metadata version 185A1. In one embodiment, if the replica 162N begins to catch up such that the buffer passes below the low watermark, then the replica 162N may be marked as read-eligible again (and the tile metadata updated accordingly).

Figure 3D:
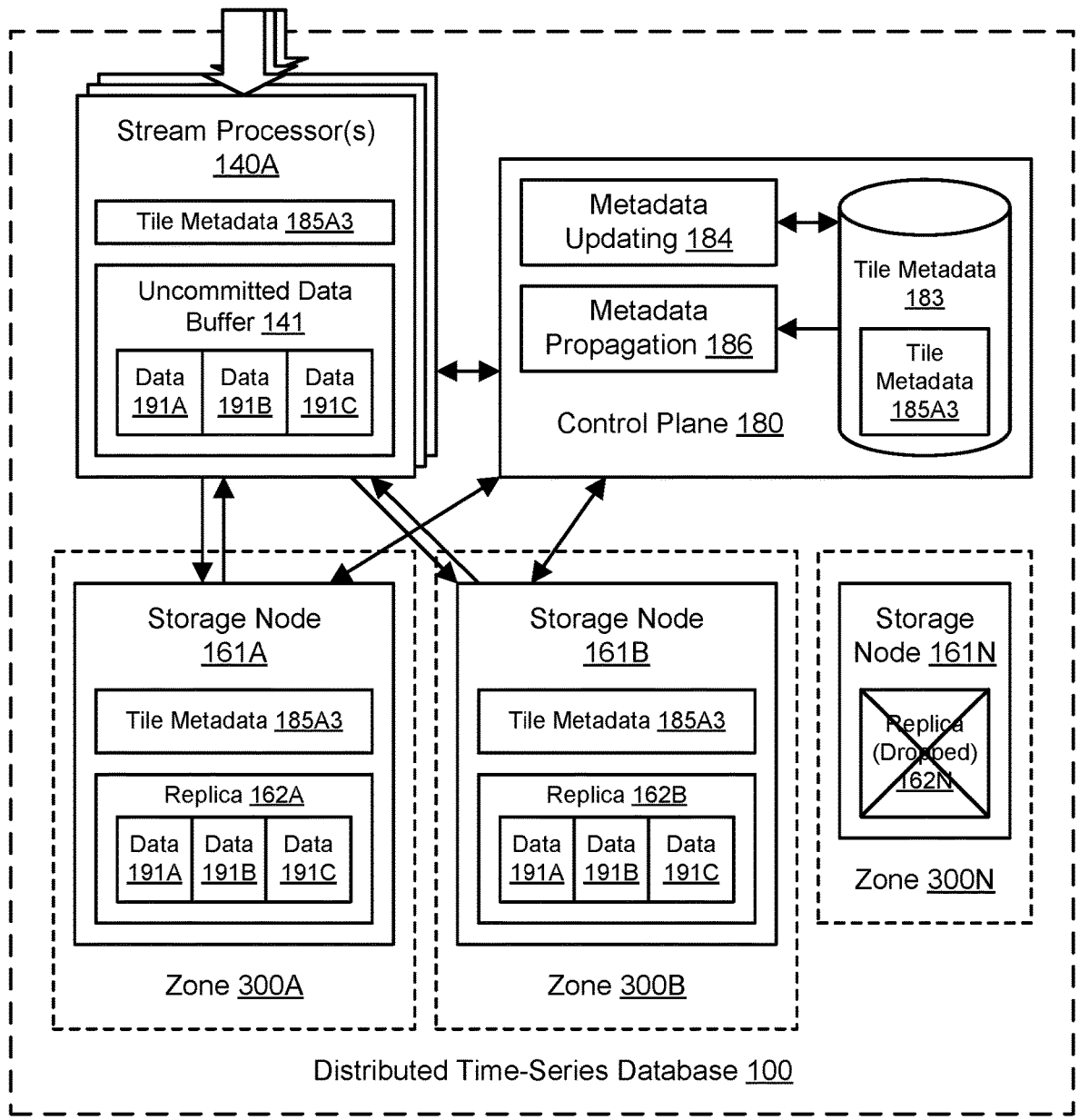

FIG. 3D represents a continuation of the example of FIG. 3C at a later point in time. As shown in the example of FIG. 3D, the maximum size for the buffer 141 may be met when the write of an additional data update 191C is acknowledged by the replicas 162A and 162B but not by the unresponsive replica 162N. The data 191C may be acknowledged by the replicas 162A and 162B with the metadata version 185A2. Based (at least in part) on the buffer being filled, further ingestion by the stream processor(s) 170A may be halted. Based (at least in part) on the buffer being filled, the control plane 180 may drop the replica 162N from the replica group. Upon dropping the replica 162N, the control plane 180 may generate and propagate updated metadata 185A3 that reflects the new membership of the replica group. The control plane 180 may either permit the replica group to continue with a lower capacity or may repair the replica group by adding a replacement replica. If the replica group continues without replacement of the dropped replica, then the stream processor(s) 140A may apply a commit protocol to the uncommitted data 191A-191C. According to the commit protocol, the data updates 191A-191C may be committed because all of the current replicas in the replica group acknowledged successful writes of the data with the replicas (at the time) having metadata version numbers 185A1 and 185A2 that are less than or equal to the current metadata version number 185A3 at the stream processor(s) 140A. Thus the stream processor(s) 140A need not retry the write requests for the updates 191A-191C with the latest version number 185A3 and may thus conserve time, network bandwidth, and computational resources. As illustrated in FIG. 3D, the replica group may be eventually consistent within some bounds, and the bounds may be determined by watermarks associated with a buffer 141 or the capacity of the buffer.

Figure 3E:
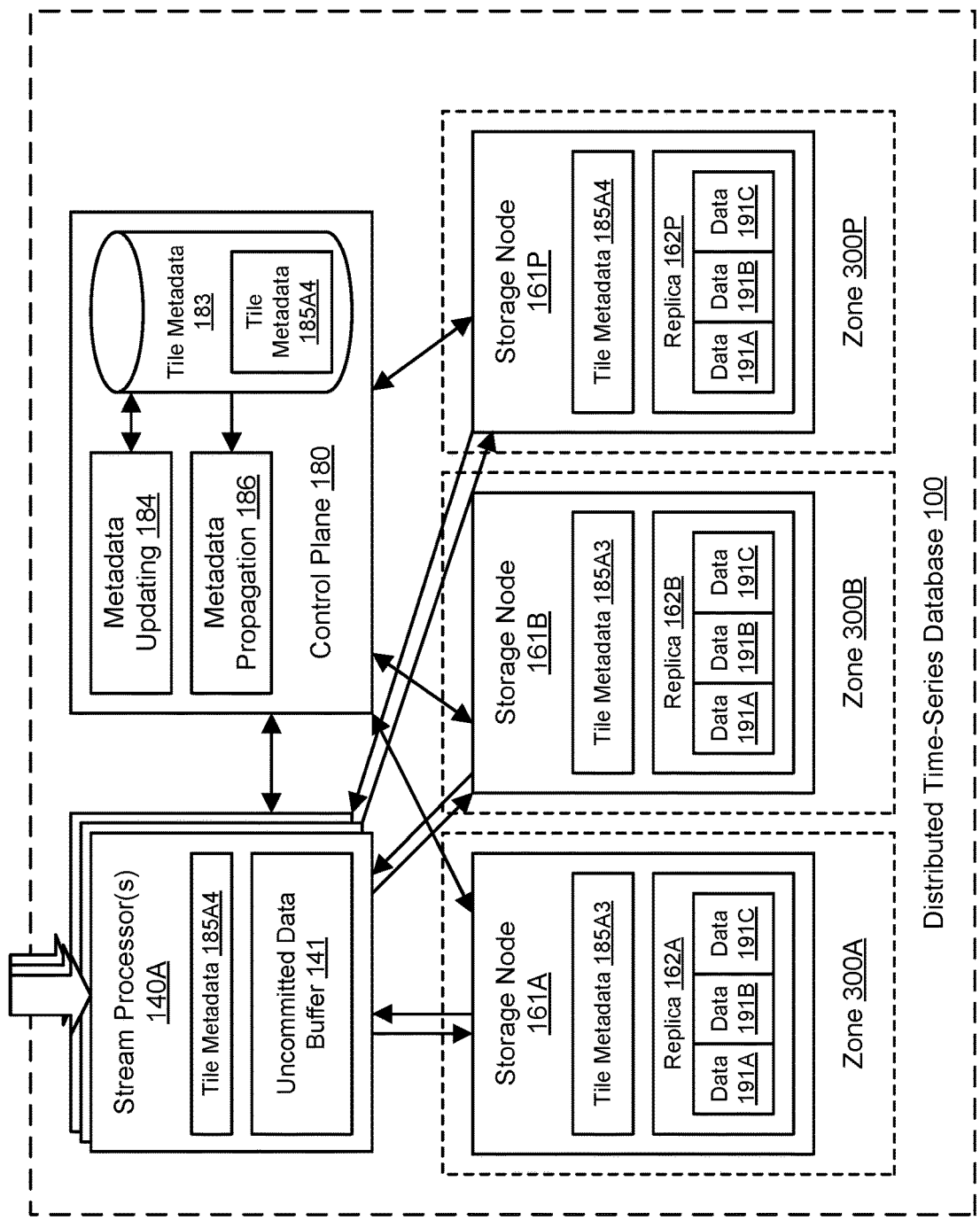

FIG. 3E represents a continuation of the example of FIG. 3D at a later point in time. As shown in the example of FIG. 3E, a new replica 162P may be added to the replica group to replace the previously dropped replica 162N. Upon adding the replica 162P, the control plane 180 may generate and propagate updated metadata 185A4 that reflects the new membership of the replica group. In one embodiment, the new replica 162P may be implemented using a storage node 161P in a zone 300P. In some embodiments, the new replica 162P may be implemented in the same zone 300N as the dropped replica 162N or in one of the other zones 300A or 300B. The new replica 162P may be hydrated using an existing replica 162A or 162B or using a different tier, such as the cold tier. The hydration may involve the new replica 162P receiving older data directly from the other replica 162A or 162B, e.g., using the query interface at that other replica. In one embodiment, the stream processor(s) 140A may issue write requests for the uncommitted updates 191A-191C to the new replica 162P having the metadata version 185A4. The write requests may be successfully acknowledged to the stream processor(s) 140A. According to the commit protocol, the data updates 191A-191C may be committed (and cleared from the buffer 141) because all of the current replicas in the replica group acknowledged successful writes of the data with the replicas (at the time) having metadata version numbers 185A1, 185A2, or 185A4 that are less than or equal to the current metadata version number 185A4 at the stream processor(s) 140A. Thus the stream processor(s) 140A need not retry the write requests for the updates 191A-191C to the older replicas 162A and 163B with the latest version number 185A4 and may thus conserve time, network bandwidth, and computational resources. As illustrated in FIG. 3E, the modified replica group may be eventually consistent within some bounds, and the bounds may be determined by watermarks associated with a buffer 141 or the capacity of the buffer.

Figure 4A:
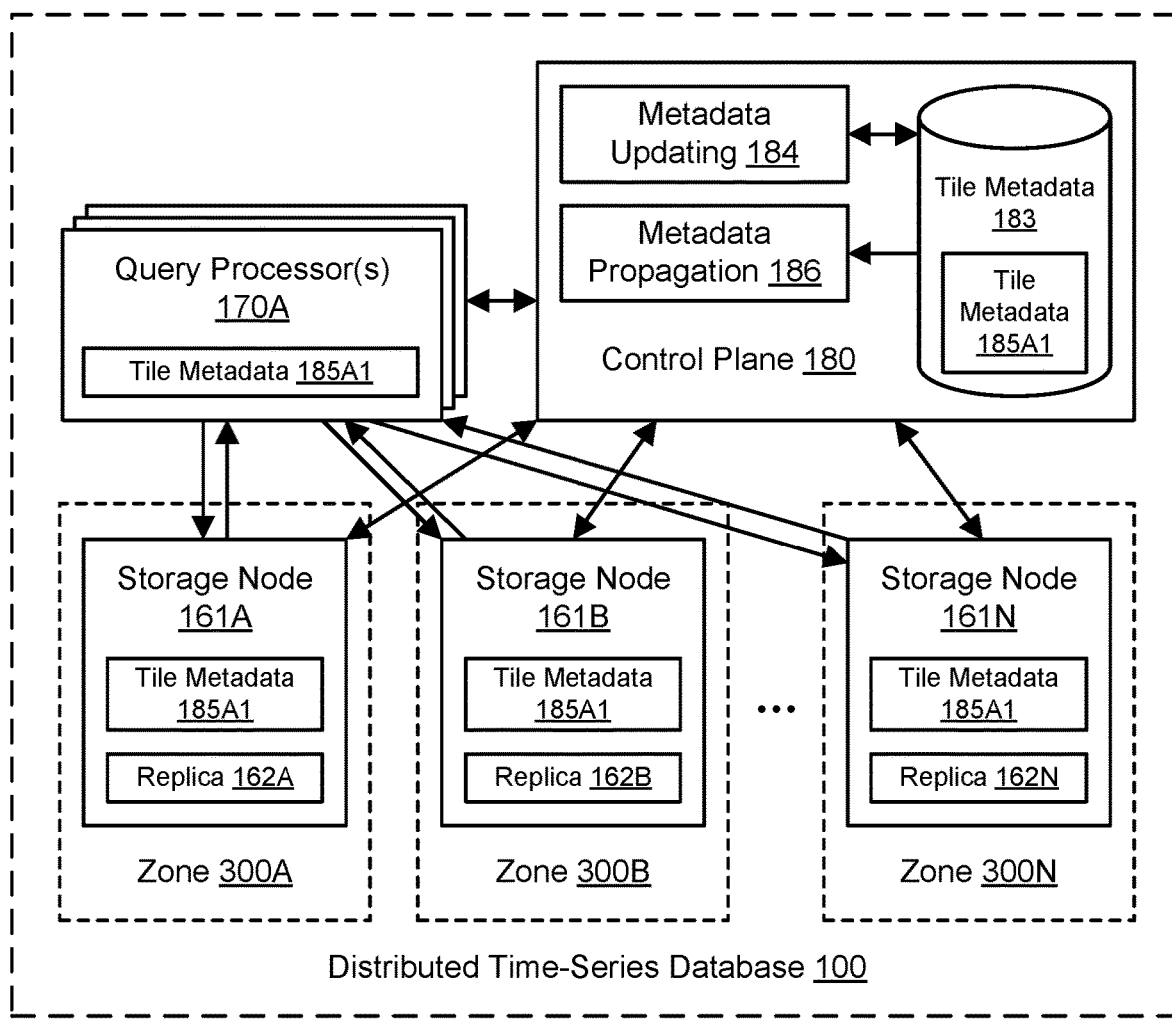
FIG. 4A and FIG. 4B illustrate further aspects of the example system environment for eventually consistent replication in a time-series database, including the use of a protocol for querying replicas in a replica group, according to some embodiments.
Figure 4B:
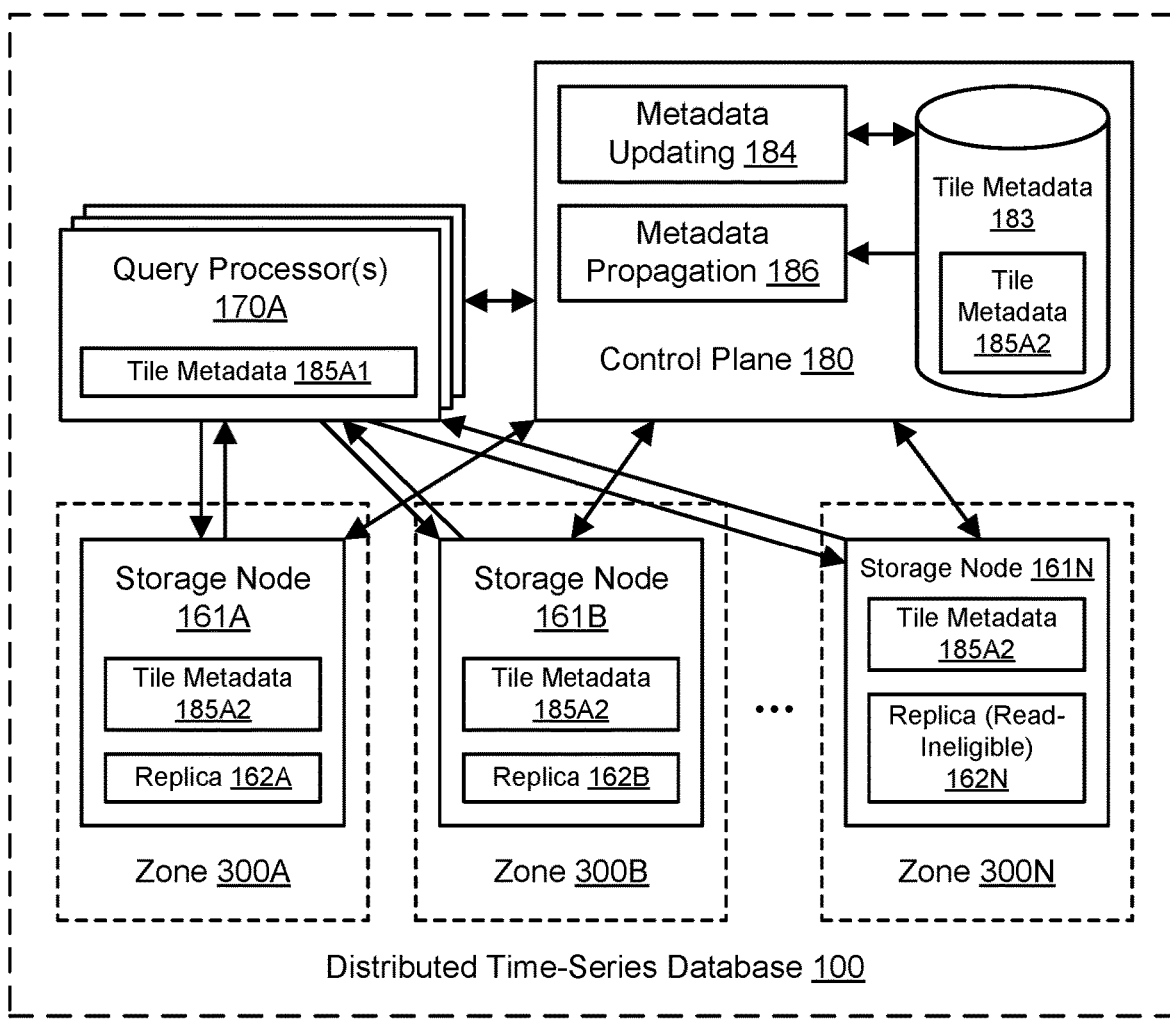

FIGS. 4A and 4B illustrate further aspects of the example system environment for eventually consistent replication in a time-series database, including the use of a protocol for querying replicas in a replica group, according to some embodiments. The control plane 180 may propagate the latest version of the tile metadata to the query processor(s) 170A. When a query processor is invoked, e.g., based on an API, the query processor may select one of the replicas in a replica group and send a query request to the selected replica. In one embodiment, the query request may indicate the version number of the tile metadata at the query processor. In one embodiment, the query request may indicate the spatial and temporal boundaries of the query. According to a protocol, the selected replica may perform or deny the query request based (at least in part) on a comparison of the metadata version number of the query request to the metadata version number of the replica. As shown in FIG. 4A, if the version numbers are equal, then the query requests may be attempted.

As shown in FIG. 4B, the replica 162N may be marked as read-ineligible in updated metadata 185A2. In this example, one or more of the replicas may obtain the updated metadata version 185A2 while the query processor(s) 170A are operating based on the outdated metadata version 185A1. In some embodiments, the equality requirement for metadata version numbers may be relaxed in such circumstances in order to reduce retries and thus improve query performance. For example, a query API may include a flag to indicate that a query is lower priority, such that some data staleness is acceptable in exchange for better query performance. In one embodiment, the recipient replica may apply a protocol to determine whether the query-client-side metadata version number (on the query processor) is less than or equal to the server-side metadata version number (on the replica) and may only perform a query if such a condition is met. In various modes of operation, the replica may apply additional constraints to query requests.

In one embodiment, in a first mode, the replica may perform the query if the metadata version number of the query request is less than or equal to the metadata version number of the replica and also if the boundaries of the request are a subset (e.g., do not exceed) the boundaries of the query. According to this protocol, the replica may deny the query request if the metadata version number of the query request is greater than the metadata version number of the replica or if the boundaries of the request are exceed the boundaries of the query. In one embodiment, in a second mode, the replica may perform the query if the metadata version number of the query request is less than or equal to the metadata version number of the replica and if a higher version number (if any) at the replica is attributable to a membership change in the replica group and not to a boundary change. According to this protocol, a query request may be denied if the version number of the request is less than the version number at the recipient replica, but the replica's metadata represents a change in the replica's spatial and/or temporal boundaries. If a query request is denied, then the query processor(s) 170A may be required to obtain the latest tile metadata version and retry the query request. The database 100 may select one of these two modes of operation based at least in part on a tradeoff between performance and staleness. For example, if some data staleness is acceptable, then query performance may be improved by preventing the query processor(s) 170A from needing to retry requests after updating their tile metadata. As another constraint to protect against excessive data staleness, a query request may be denied if the replica has metadata indicating that the replica is read-ineligible. In some embodiments, backfill requests from other replicas (e.g., for hydration of new replicas) may be performed according to the same protocol(s) as query requests from query processors.

Figure 5:
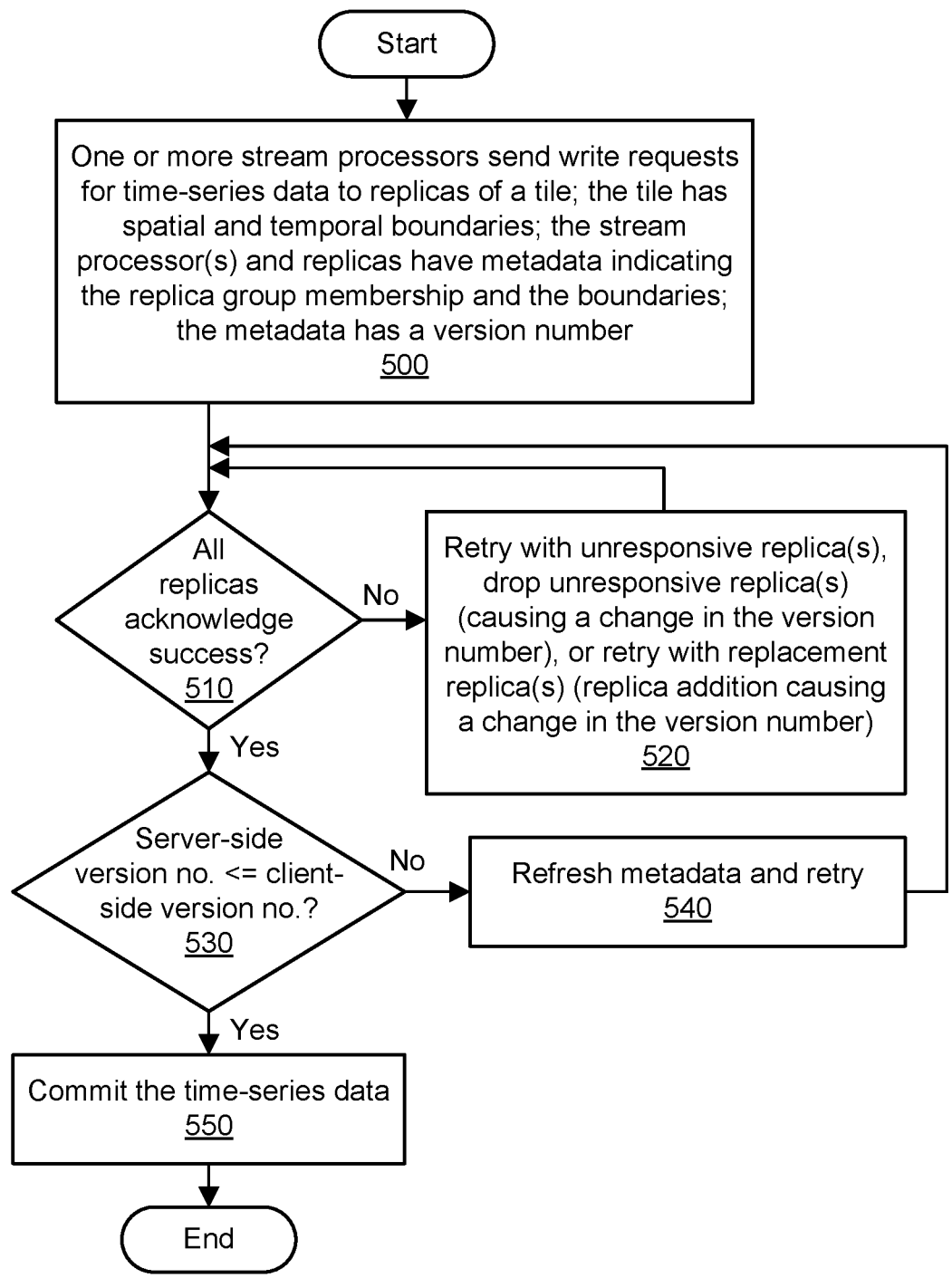
FIG. 5 is a flowchart illustrating a method for eventually consistent replication in a time-series database, including committing writes to a replica group according to a protocol, according to some embodiments.

FIG. 5 is a flowchart illustrating a method for eventually consistent replication in a time-series database, including committing writes to a replica group according to a protocol, according to some embodiments. As shown in 500, one or more stream processors may send write requests for one or more elements of time-series data to replicas of a tile. The tile may have spatial and temporal boundaries, and the elements may be within those boundaries. Both the stream processor(s) and the replicas may have replica group (tile) metadata that indicates the membership of the replica group, the status of individual replicas, and the boundaries of the tile. The metadata may be updated to reflect state transitions in the replica group, and each snapshot of the metadata may have a version number. The version numbers may differ at the stream processor(s) and replicas as newer metadata is propagated throughout the database.

At an individual replica, a write request may be attempted if the version number in the request is the same as the version number at the replica. As shown in 510, the method may determine whether all of the replicas have acknowledged successful writes of the one or more elements to the stream processor(s). If not, then as shown in 520, the stream processor(s) may retry the write request(s) to one or more unresponsive replicas. Alternatively, as shown in 520, a control plane may drop one or more replicas from the replica group, e.g., if the replicas are unresponsive for too long. Such a change may result in new metadata reflecting the new replica group membership and having a higher version number. As shown in 520, the control plane may add one or more replacement replicas to the replica group, also resulting in new metadata reflecting the new replica group membership and having a higher version number, and the stream processor(s) may retry the write requests(s) for the new replica(s).

As shown in 530, if all the replicas in the group have acknowledged successful writes of the one or more elements, then the stream processor(s) may apply a commit protocol to determine whether the server-side metadata version number (on the replicas) at the time of successful write acknowledgement is less than or equal to the client-side metadata version number (on the stream processor(s). If not, then as shown in 540, the method may propagate the updated metadata to the outdated component(s) such as the stream processor(s), and the stream processor(s) may retry the write request(s) for any replica(s) that failed to meet the commit protocol. As shown in 550, if the commit protocol was met for every replica in the replica group, then the stream processor(s) may commit the one or more elements of time-series data. Committing the time-series data may include removing the data from a buffer of pending and uncommitted updates. Committing the time-series data may also include reporting a successful addition of the time-series data to one or more upstream components of the distributed time-series database.

Figure 6A:
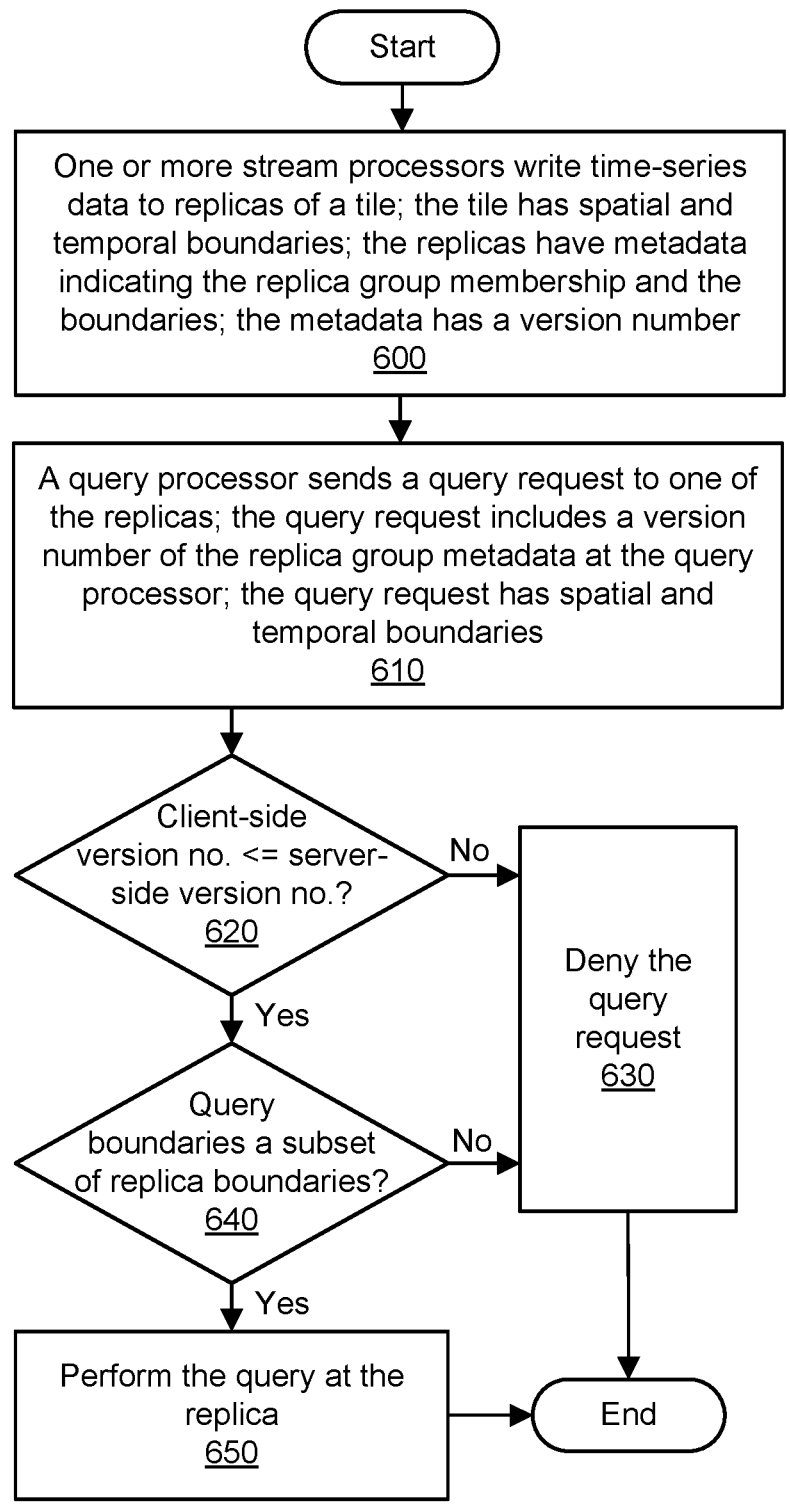
FIG. 6A and FIG. 6B are flowcharts illustrating methods for eventually consistent replication in a time-series database, including approving or denying query requests to replicas according to a protocol, according to some embodiments.
Figure 6B:
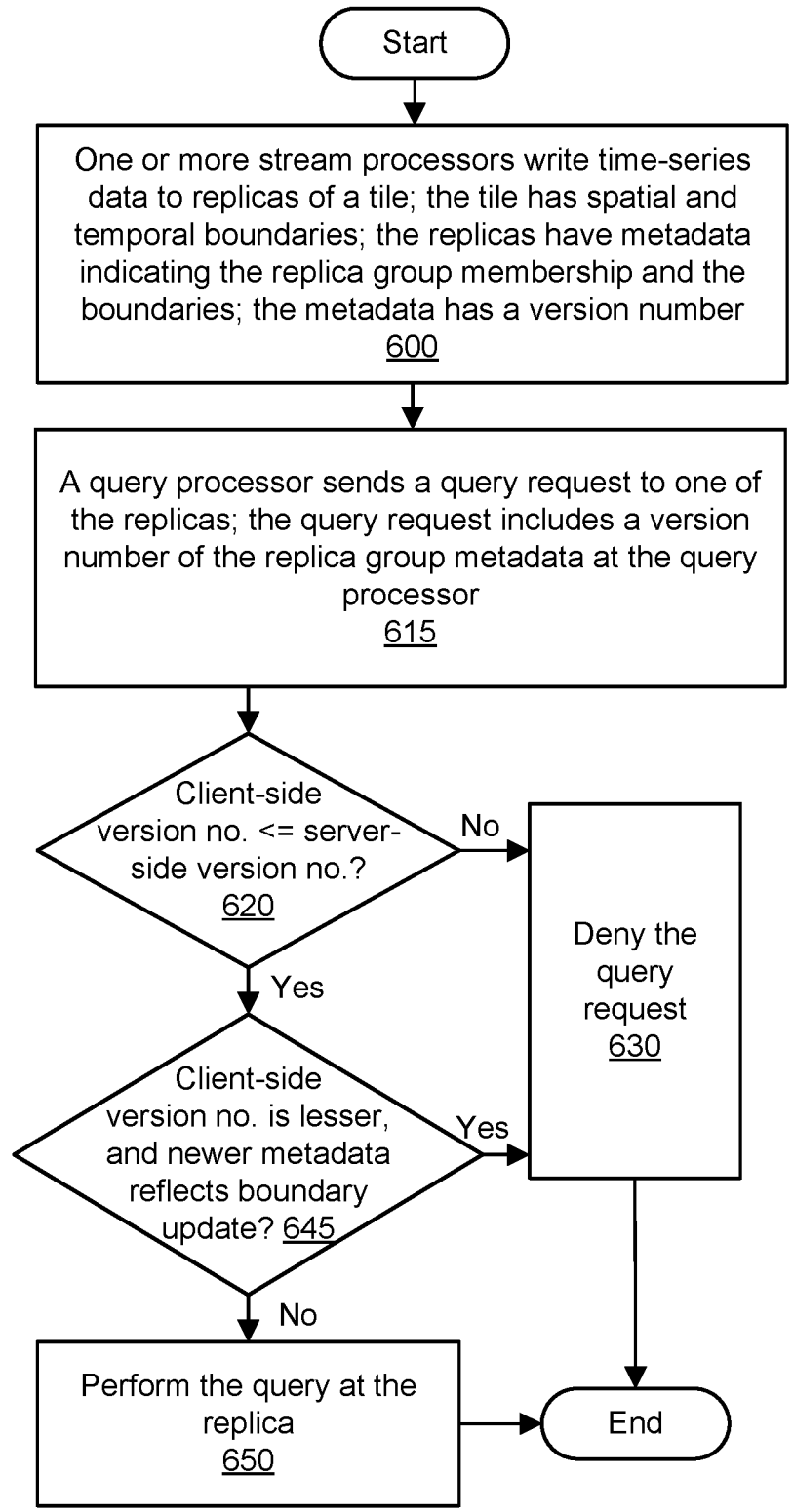

FIG. 6A and FIG. 6B are flowcharts illustrating methods for eventually consistent replication in a time-series database, including approving or denying query requests to replicas according to a protocol, according to some embodiments. As shown in 600, one or more stream processors may write one or more elements of time-series data to replicas of a tile. The tile may have spatial and temporal boundaries, and the elements may be within those boundaries. As shown in 610, a query processor may send a query request to a replica. The query processor and the replicas may have replica group (tile) metadata that indicates the membership of the replica group, the status of individual replicas, and the boundaries of the tile. The metadata may be updated to reflect state transitions in the replica group, and each snapshot of the metadata may have a version number. The version numbers may differ at the query processor and replicas as newer metadata is propagated throughout the database. The query request may include or otherwise reference the version number of the replica group metadata at the query processor. The query request may indicate the spatial and temporal boundaries of the query.

As shown in 620, the recipient replica may apply a protocol to determine whether the query-client-side metadata version number (on the query processor) is less than or equal to the server-side metadata version number (on the replica). If not, then as shown in 630, the replica may deny the query request. As a result of receiving the denial, the query processor may retry the query request with the same replica (with the expectation that the updated metadata will be propagated throughout the system) or another replica. As shown in 640, the recipient replica may apply a protocol to determine whether the spatial and temporal boundaries of the query are a subset of the spatial and temporal boundaries of the replica. If not, then as shown in 630, the replica may deny the query request. If so, then as shown in 650, the replica may attempt to perform the query. Performing the query may include determining query results representing one or more elements of time-series data and reporting those results to the query processor. By relaxing the requirement that the query processor and replica have the same metadata snapshot version, the performance of queries may be improved by reducing query retries.

FIG. 6B illustrates a variation of the query protocol shown in FIG. 6A. As shown in 600, one or more stream processors may write one or more elements of time-series data to replicas of a tile. As shown in 615, a query processor may send a query request to a replica. The query processor and the replicas may have replica group (tile) metadata that indicates the membership of the replica group, the status of individual replicas, and the boundaries of the tile. The metadata may be updated to reflect state transitions in the replica group, and each snapshot of the metadata may have a version number. The version numbers may differ at the query processor and replicas as newer metadata is propagated throughout the database. The query request may include or otherwise reference the version number of the replica group metadata at the query processor.

As shown in 620, the recipient replica may apply a protocol to determine whether the query-client-side metadata version number (on the query processor) is less than or equal to the server-side metadata version number (on the replica). If not, then as shown in 630, the replica may deny the query request. As shown in 645, if the query-client-side version number is lesser than the server-side version number, then the recipient replica may apply a protocol to determine whether the different in metadata snapshot versions is attributable to a membership change in the replica group and not a boundary change. If not, then as shown in 630, the replica may deny the query request. If so, then as shown in 650, the replica may attempt to perform the query. Again, by relaxing the requirement that the query processor and replica have the same metadata snapshot version, the performance of queries may be improved by reducing query retries.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of storage nodes storing replicas of a replica group, wherein the replica group is associated with spatial and temporal boundaries of one or more time series, wherein the replicas store server-side metadata associated with the replica group and having a server-side version number, and wherein the server-side metadata is obtained by the storage nodes from a metadata repository;
one or more stream processors configured to send, to the replicas, write requests for time-series data within the spatial and temporal boundaries, wherein the one or more stream processors store client-side metadata associated with the replica group and having a client-side version number, wherein the write requests comprise the client-side version number, wherein an element of the time-series data is committed to the replica group if each of the replicas acknowledges a successful write of the element based at least in part on a comparison of the server-side version number to the client-side version number; and
one or more query processors configured to send, to the replicas, query requests for the time-series data, wherein the one or more query processors store query-client-side metadata associated with the replica group and having a query-client-side version number, wherein the query requests comprise the query-client-side version number, and wherein the query request is performed by one of the replicas based at least in part on a comparison of the server-side version number to the query-client-side version number.

2. The system as recited in claim 1, wherein the query request is performed by the one of the replicas based at least in part on the query-client-side version number being less than or equal to the server-side version number and based at least in part on spatial and temporal boundaries of the query request being a subset of spatial and temporal boundaries of the one of the replicas.

3. The system as recited in claim 1, wherein the query request is performed by the one of the replicas based at least in part on the query-client-side version number being less than the server-side version number and based at least in part on the server-side metadata number representing a membership change in the replica group and not a change in the spatial or temporal boundaries of the one of the replicas.

4. The system as recited in claim 1, wherein the element of the time-series data is committed to the replica group if the server-side version number is less than or equal to the client-side version number for each of the replicas.

5. A method, comprising:
storing time-series data in a plurality of replicas of a replica group, wherein the time-series data is within spatial and temporal boundaries of the replica group, and wherein the replicas store a server-side version number of replica group metadata;
sending a query request from a query processor to a first replica of the replica group, wherein the query request comprises a query-client-side version number of the replica group metadata;
performing, by the first replica, a comparison of the query-client-side version number to the server-side version number; and
generating a successful response to the query request or denying the query request based at least in part on the comparison, wherein the successful response comprises one or more elements of the time-series data.

6. The method as recited in claim 5, wherein a successful response to the query request is generated by the first replica based at least in part on the query-client-side version number being less than or equal to the server-side version number and based at least in part on spatial and temporal boundaries of the query request being a subset of spatial and temporal boundaries of the first replica.

7. The method as recited in claim 6, wherein the query request is associated with a low-priority flag in an application programming interface.

8. The method as recited in claim 5, wherein the query request is denied by the first replica based at least in part on the query-client-side version number being less than or equal to the server-side version number and based at least in part on spatial and temporal boundaries of the query request not being a subset of spatial and temporal boundaries of the first replica.

9. The system as recited in claim 5, wherein a successful response to the query request is generated by the first replica based at least in part on the query-client-side version number being less than the server-side version number and based at least in part on the server-side metadata number representing a membership change in the replica group and not a change in spatial or temporal boundaries of the first replica.

10. The system as recited in claim 5, wherein the query request is denied by the first replica based at least in part on the query-client-side version number being less than the server-side version number and based at least in part on the server-side metadata number representing a change in spatial or temporal boundaries of the first replica.

11. The system as recited in claim 5, wherein the query request is denied by the first replica based at least in part on an indication in the replica group metadata that the first replica is read-ineligible.

12. The system as recited in claim 11, wherein the first replica is indicated as read-ineligible in the replica group metadata based at least in part on an unavailability of the first replica for writing new elements of the time-series data.

13. One or more non-transitory computer-readable storage media storing program instructions that, when executed on or across one or more processors, perform:
sending write requests for an element of time-series data from a stream processor to a plurality of replicas of a replica group, wherein the element of time-series data is within spatial and temporal boundaries of the replica group, and wherein the replicas store a server-side version number of replica group metadata, and wherein the write requests comprise a client-side version number of the replica group metadata;
storing, by one or more of the replicas, the element of time-series data based at least in part on a comparison of the server-side version number to the client-side version number; and
sending, to the stream processor, updated replica group metadata having a higher client-side version number; and
determining, by the stream processor, that the element of time-series data is committed based at least in part on acknowledgements of successful writes by each replica of the replica group, wherein the acknowledgements are associated with server-side version numbers less than or equal to the higher client-side version number.

14. The one or more non-transitory computer-readable storage media as recited in claim 13, further comprising additional program instructions that, when executed on or across the one or more processors, perform:
- based at least in part on a higher unavailability threshold, modifying the replica group metadata to indicate read-ineligibility of one or more replicas that did not successfully write the element of time-series data, wherein the updated replica group metadata represents the read-ineligibility; and
- sending one or more write requests having the higher client-side version number to the one or more replicas that did not successfully write the element of time-series data.

15. The one or more non-transitory computer-readable storage media as recited in claim 14, further comprising additional program instructions that, when executed on or across the one or more processors, perform:
- based at least in part on a lower unavailability threshold, modifying the replica group metadata to indicate read-eligibility of the one or more replicas that did not successfully write the element of time-series data.

16. The one or more non-transitory computer-readable storage media as recited in claim 13, wherein one or more replicas that did not successfully write the element of time-series data are removed from the replica group based at least in part on a maximum buffer size for pending time-series data being reached at the stream processor.

17. The one or more non-transitory computer-readable storage media as recited in claim 16, further comprising additional program instructions that, when executed on or across the one or more processors, perform:
- modifying the replica group metadata to indicate addition of one or more new replicas replacing the one or more replicas that were removed from the replica group, wherein the one or more new replicas store a higher server-side version number of the replica group metadata.

18. The one or more non-transitory computer-readable storage media as recited in claim 17, further comprising additional program instructions that, when executed on or across the one or more processors, perform:
- sending one or more additional write requests for the element of time-series data from the stream processor to the one or more new replicas, wherein the one or more additional write requests are associated with the higher client-side version number; and
- storing, by the one or more additional replicas, the element of time-series data based at least in part on the higher server-side version number matching the higher client-side version number.

19. The one or more non-transitory computer-readable storage media as recited in claim 13, wherein the element of time-series data is determined by the stream processor to be committed without sending one or more additional write requests comprising the higher client-side version number to one or more replicas that acknowledged writing with the server-side version number.

20. The one or more non-transitory computer-readable storage media as recited in claim 13, wherein the replica group is eventually consistent.

* * * * *